United States Patent
Ni et al.

(10) Patent No.: US 7,139,628 B2
(45) Date of Patent: Nov. 21, 2006

(54) SYSTEM AND METHOD FOR FABRICATION BACKUP CONTROL

(75) Inventors: Cheng-Yao Ni, Jhubei (TW); I-Chieh Chung, Hsinchu (TW); Tsui-Ling Chang, Fongyuan (TW); Yi-Huei Lin, Dajia Township, Taichung County (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 276 days.

(21) Appl. No.: 10/832,176

(22) Filed: Apr. 26, 2004

(65) Prior Publication Data

US 2005/0240298 A1 Oct. 27, 2005

(51) Int. Cl.
*G06F 19/00* (2006.01)

(52) U.S. Cl. .................. 700/99; 700/103; 700/100; 700/116

(58) Field of Classification Search ............. 700/99, 700/100, 79, 103, 115, 116, 82
See application file for complete search history.

(56) References Cited

U.S. PATENT DOCUMENTS

| 6,678,566 | B1 * | 1/2004 | Ho et al. ............... 700/82 |
| 2002/0165629 | A1 | 11/2002 | Ho et al. ............... 700/82 |
| 2005/0080501 | A1 * | 4/2005 | Shen ..................... 700/96 |
| 2005/0216110 | A1 * | 9/2005 | Chen et al. ............. 700/99 |

\* cited by examiner

*Primary Examiner*—Leo Picard
*Assistant Examiner*—Steven R. Garland
(74) *Attorney, Agent, or Firm*—Thomas, Kayden, Horstemeyer & Risley

(57) ABSTRACT

A backup control system within a fabrication system is provided. The fabrication system contains a plurality of separately located fabrication facilities, each of which contains a computer assisted production control system and a plurality of processing tools. The backup control system, coupled with the computer assisted production control systems, provides control of backup operations between the fabrication facilities, and relays manufacturing constraints of the backup-operated articles before and after the backup operation.

19 Claims, 5 Drawing Sheets

SYSTEM AND METHOD FOR FABRICATION BACKUP CONTROL

BACKGROUND

The present invention relates to a fabrication control system and particularly to a fabrication control system capable of controlling fabrication backup applied in multiple fabrication facility locations.

FIG. 1 is a schematic view showing a conventional fabrication system 100, capable of fabricating semiconductor wafers, and containing Fabs 11 and 13. Fabs 11 and 13 are not identical in tool composition, but have similar and/or partially overlapping tool sets. Fabs 11 and 13 contain tools 11a~11n and 13a~13n respectively. Tools 11a~11n and 13a~13n are controlled by Manufacturing Execution Systems (MESs) 110 and 130 respectively. Although both Fabs 11 and 13 belong to fabrication system 100, they are not only geographically separated but also operate discretely. Because of the discrete operation, workloads allocated to Fab 11 cannot be processed in Fab 13, and vice versa. Even though Fab 13 is available for providing backup operation, Fab 11 loading must wait for processing when a bottlenecked tool is backed up. Thus, some tools in Fab 13 may remain idle despite Fab 11 having wafer lots queued at a corresponding tool. The independent operation of Fabs 11 and 13 actually hinders fabrication system 100 from optimizing utilization.

While cross-Fab backup within a fabrication system is clearly desired, it is not routinely practiced due to great difficulty in monitoring and controlling a plurality of separately located independent fabrication facilities. Cross-Fab backup is presently executed manually in the conventional fabrication system, an inefficient and mistake-prone process. Moreover, owing to the complexity of wafer fabrication, the conventional cross-Fab backup cannot address every detail of process operation, resulting in yield loss. In U.S. patent application Ser. No. 20020165629 (Backup control system for optimizing utilization of multiple fabrication facilities), Ho et al. disclose a backup control system and method for monitoring and controlling multiple fabrication facilities. The above-mentioned invention relieves the manual burden of conventional cross-Fab backup and enhances the overall utilization of the multiple fabrication facilities.

In wafer fabrication processes, however, most work-in-process (WIP) has manufacturing constraints, based on process time, equipment, Advance Process Control (APC), and contamination. These manufacturing constraints are set to prevent mis-operation and yield loss. Both the conventional method and the cited disclosure fail to relay these manufacturing constraints between Fabs during cross-Fab backup, thereby increasing the likelihood of mis-operation and yield loss, and thus counteracting the benefits of cross-Fab backup operation.

Hence, there is a need for a fabrication system that addresses mis-operation during cross-Fab backup arising from the existing technology.

SUMMARY

It is therefore an object of the invention to provide a system and method of backup control to enhance the overall utilization of a fabrication system without yield loss. To achieve this and other objects, the present invention provides a system and method of relaying manufacturing constraints between separately located Fabs during cross-Fab backup.

According to one embodiment of the invention, a backup control system is provided within a fabrication system. The fabrication system contains a plurality of separately located fabrication facilities, each of which contains a computer assisted production control system and a plurality of processing tools.

The backup control system, coupled with the computer assisted production control systems, provides control of backup operations between the fabrication facilities, and relays manufacturing constraints of the backup-operated articles before and after the backup operation.

According to another embodiment of the invention, a backup control method is provided controlling the backup operation of articles in the separately located fabrication facilities within the fabrication system mentioned above. First, a backup request is received from a first fabrication facility, wherein the backup request comprises identification codes of the backup-operated articles, backup operation, and support manufacturing facility. Second, a first manufacturing constraint is retrieved from the first manufacturing facility according to the identification codes of the backup-operated articles and the backup operation. Then the backup request and the first manufacturing constraint are transmitted to a second manufacturing facility according to the identification code of the support manufacturing facility. Next, a backup completion report is received from the second fabrication facility, wherein the backup completion report comprises identification codes for the backup-operated articles and a second manufacturing constraint. Then, the backup completion report is transmitted to the first fabrication facility.

The above-mentioned method may take the form of program code embodied in a computer readable tangible media. When the program code is loaded into and executed by a machine, the machine becomes an apparatus for practicing the invention.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

The present invention will now be described with reference to FIGS. 2 to 5, which in general relate to a backup control system within a fabrication system. While the preferred embodiment of the invention operates with semiconductor fabrication systems, it is understood that the type of article processed by the fabrication system is not critical to the present invention, and any fabrication system processing articles having dynamic manufacturing constraints may utilize the present invention.

Figure 1:
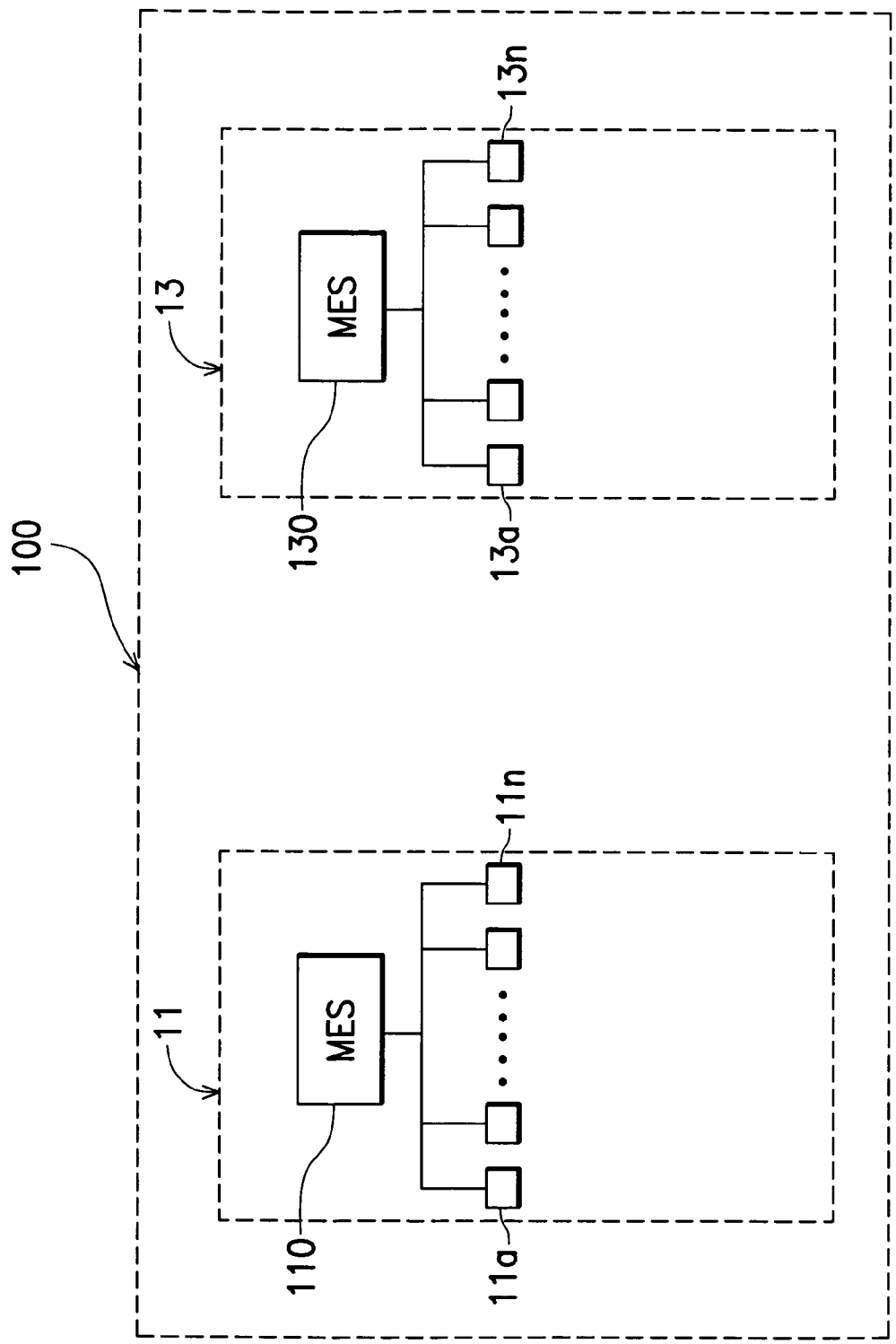
FIG. 1 is a schematic view of a conventional fabrication system.
Figure 2:
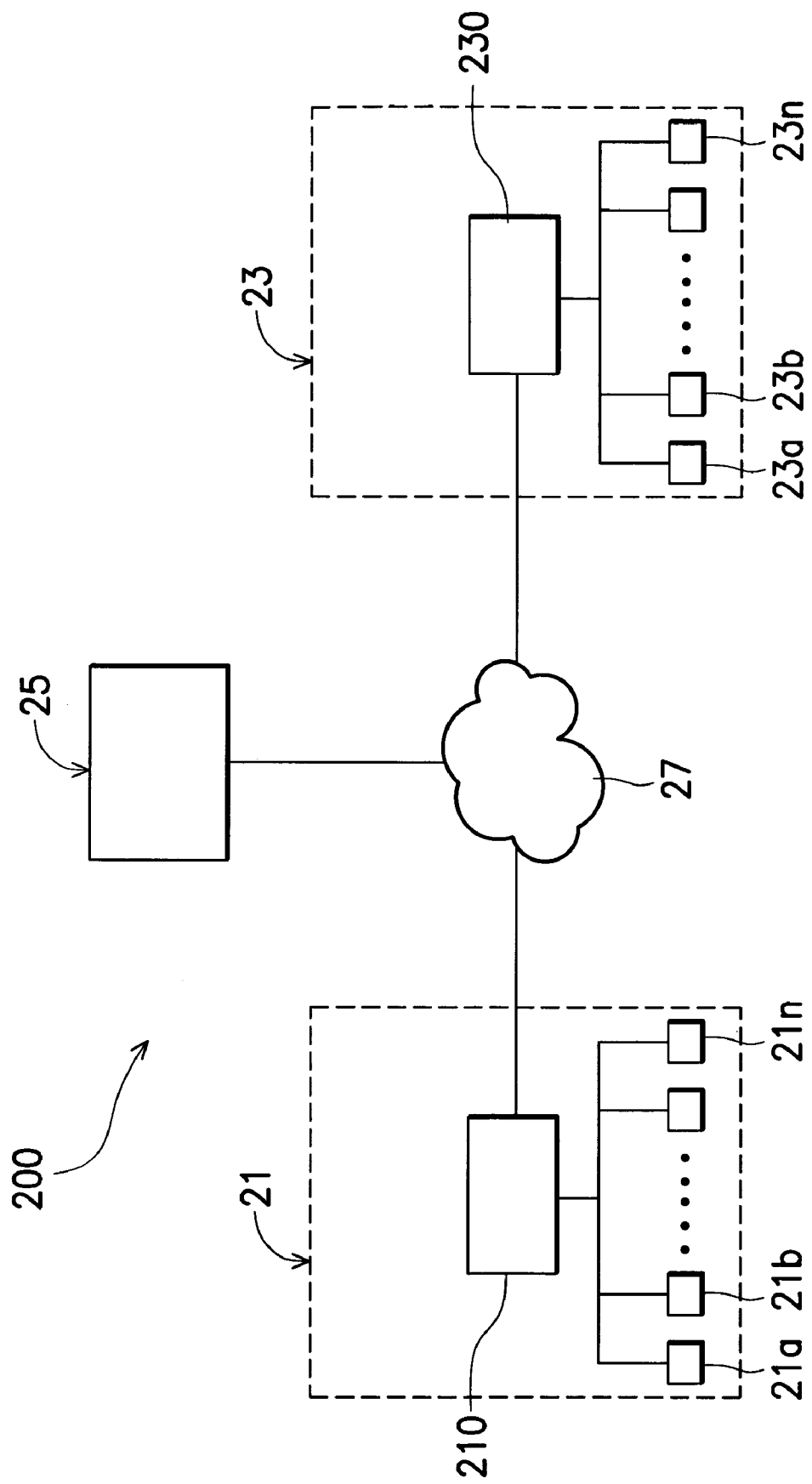
FIG. 2 is a schematic view of a fabrication system according to one embodiment of the present invention.

FIG. 2 is a schematic view of a fabrication system according to one embodiment of the present invention. The fabrication system 200 is a semiconductor fabrication system, and contains Fabs 21 and 23 and a backup control system 25.

Each Fab comprises a plurality of processing tools for performing various wafer fabrication functions and a manufacturing execution system (MES) for controlling the processing tools thereof. Fab 21, for example, contains MES 210 and processing tools 21a to 21n, wherein the processing tool 21a has photolithography function. Fab 23 contains MES 230 and processing tools 23a to 23n, wherein the processing tool 23a also has photolithography function.

Backup control system 25, coupled with MES 210 and MES 230 through a network 27, controls backup operations between Fabs 21 and 23, and relays manufacturing constraints of the backup-operated wafer lots before and after the backup operation. When the capacity of processing tool 21a to process wafer lots scheduled to be processed by processing tool 21a is exceeded there is a need for backup operation. As mentioned above, since both processing tools 21a and 23a are capable of photolithography processing, processing tool 23a is a candidate for backup operation on behalf of processing tool 21a. If processing tool 23a has suitable capacity and capability, then processing tool 21a sends a backup request to backup control system 25 requesting backup support from Fab 23. The backup control system 25 receives the backup request, retrieves the corresponding manufacturing constraints, and relays the manufacturing constraints together with the backup request to Fab 23. Fab 23 receives the backup request and the corresponding manufacturing constraints, and waits for the backup-due wafer lot. Processing tool 23a processes the wafer lot when it arrives. When the backup operation is accomplished, Fab 23 updates the manufacturing constraints, returns the processed wafer lot to Fab 21, and sends a backup completion report to backup control system 25. The backup control system 25 receives the backup completion report and the updated manufacturing constraints of the backup-operated articles from Fab 23, and relays them to Fab 21.

Figure 3:
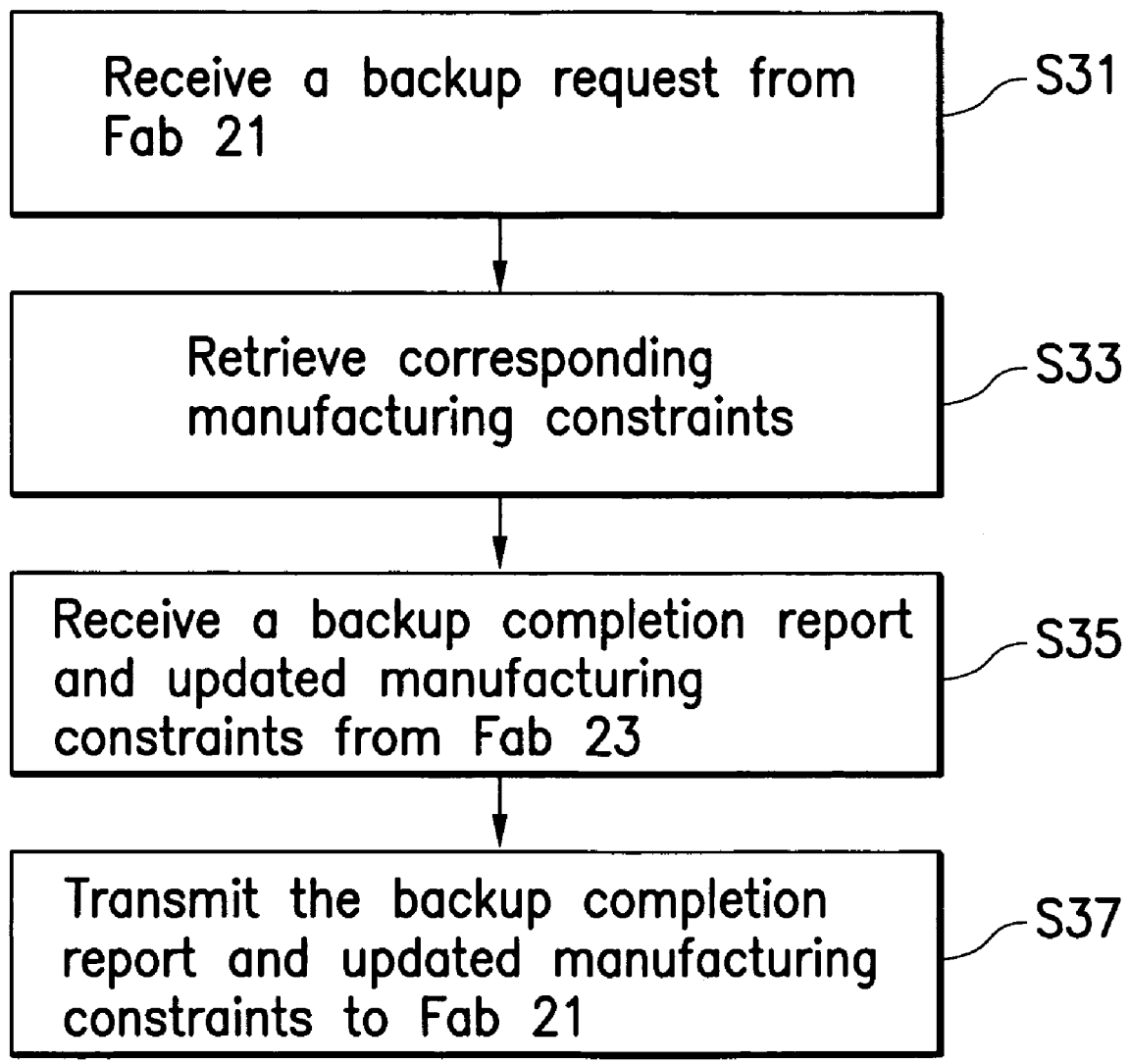
FIG. 3 is a flowchart of the backup control operation of the system in FIG. 2.

FIG. 3 is a flowchart of the backup control operation of the system described above. The backup control method shown in FIG. 3 is implemented in backup control system 25 for controlling backup control operation of wafer lots within the fabrication system 200.

Figure 4:
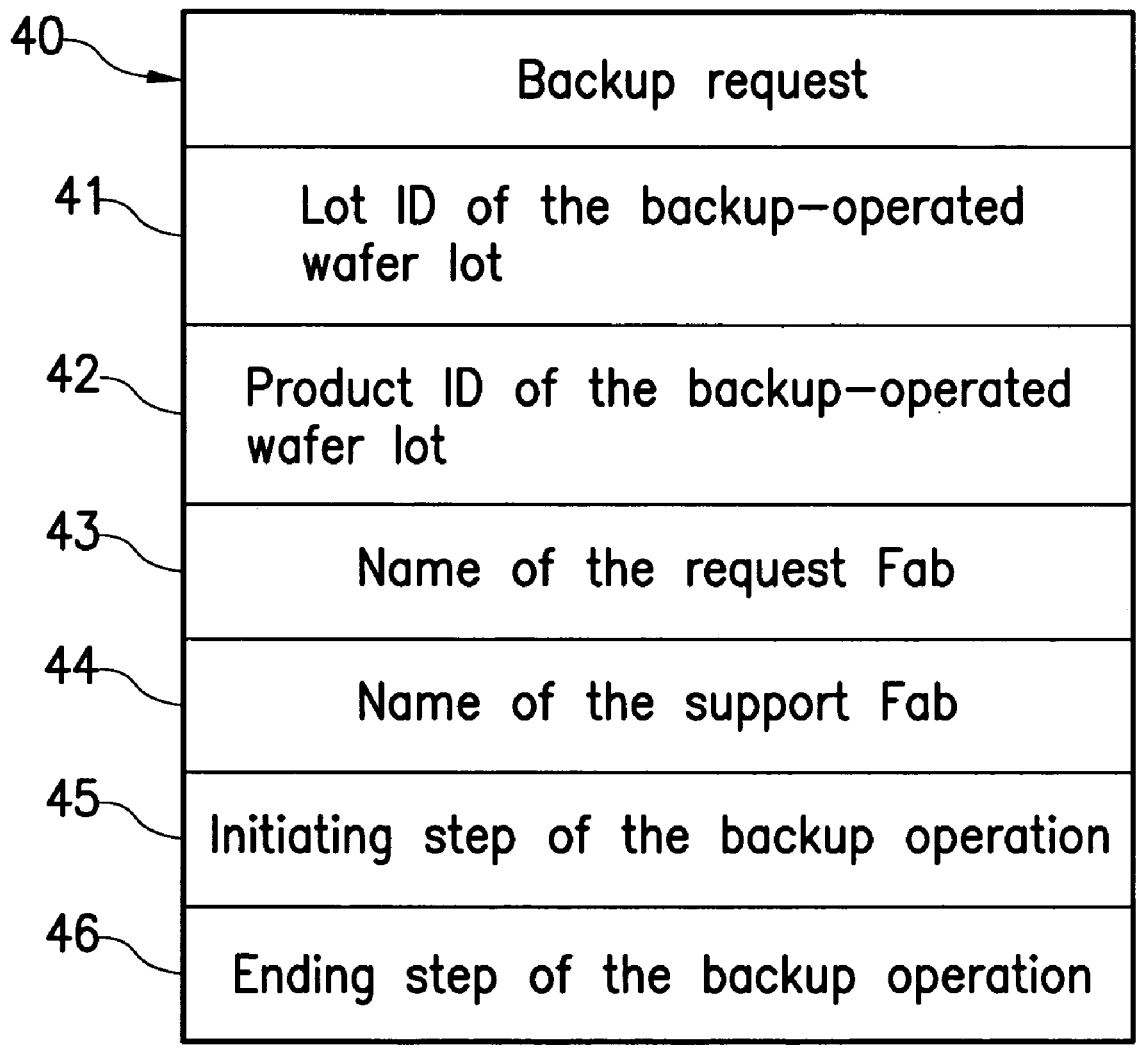
FIG. 4 shows a backup request in accordance with the present invention.

First, a backup request is received from Fab 21 (step S31) The content of the backup request is shown in FIG. 4. A backup request 40 contains fields for the lot ID of the backup-operated wafer lot (field 41), product ID of the backup-operated wafer lot (field 42), name of the request Fab (field 43), name of the support Fab (field 44), initiating step of the backup operation (field 45), and ending step of the backup operation (field 46).

Second, manufacturing constraints corresponding to the backup-operated wafer lot are retrieved from MES 210 according to the lot ID of the backup-operated wafer lot and the steps scheduled to be executed in Fab 23 (step S33).

After the backup operation is accomplished, a backup completion report and updated manufacturing constraints are received from Fab 23 (step S35) and transmitted to Fab 21 (step S37). When Fab 21 receives the backup completion report and updated manufacturing constraints, it updates the manufacturing constraints of the backup-operated wafer lot accordingly. Then the wafer lot continues processing in Fab 21.

The backup control method implemented in the backup control system of the present invention, or certain aspects or portions thereof, may take the form of program code (i.e. instructions) embodied in a tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 5:
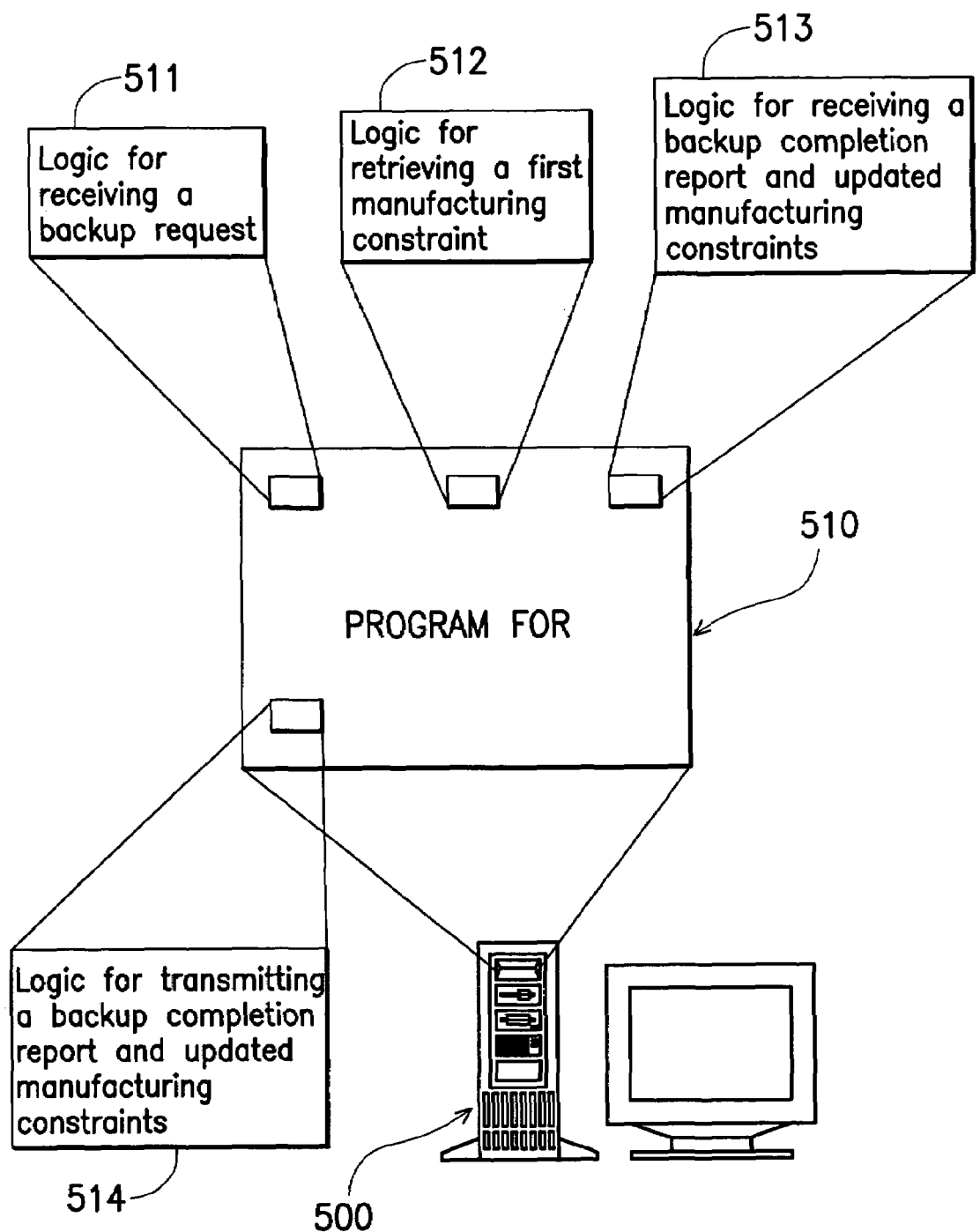
FIG. 5 is a diagram of a storage medium storing a computer program providing the backup control method of the present invention.

FIG. 5 is a schematic diagram of a storage medium for a computer program providing the backup control method according to the present invention. The computer program product includes a storage medium 510 having computer readable program code embodied in the medium for use in a computer system 500, the computer readable program code comprising at least computer readable program code 511 receiving a backup request from a first fabrication facility, computer readable program code 512 retrieving a first manufacturing constraint from the first manufacturing facility according to the identification codes of the backup-operated articles and the backup operation, computer readable program code 513 receiving a backup completion report and updated manufacturing constraints from the second fabrication facility, and computer readable program code 514 transmitting the backup completion report and updated manufacturing constraints to the first fabrication facility.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fabrication system, comprising:
a plurality of fabrication facilities, each of which comprises a computer assisted production control system and a plurality of processing tools for processing articles; and
a backup control system, coupled to the computer assisted production control systems, for controlling backup operations between the fabrication facilities, receiving a backup request from a first fabrication facility, retrieving manufacturing constraints corresponding to articles to be processed by a backup operation, wherein the backup control system further receives a backup completion report and updated manufacturing constraints of the backup-operated articles from the second fabrication facility, and relays them to the first fabrication facility.

2. The fabrication system of claim 1, wherein the manufacturing constraints are dynamic manufacturing constraints, which vary with progress of the articles.

3. The fabrication system of claim 2, wherein the manufacturing constraints comprise a queue time constraint.

4. The fabrication system of claim 2, wherein the manufacturing constraints comprise an equipment constraint.

5. The fabrication system of claim 2, wherein the manufacturing constraints comprise a feedback constraint.

6. The fabrication system of claim 2, wherein the manufacturing constraints comprise a contamination constraint.

7. A manufacturing method executing backup manufacture of articles in a manufacturing system, wherein the manufacturing system comprises a backup control subsystem and a plurality of manufacturing facilities, the method comprising:
   receiving a backup request from a first fabrication facility, wherein the backup request comprises identification codes of articles to be processed by a backup operation, the backup operation, and support manufacturing facility;
   retrieving a first manufacturing constraint from the first fabrication facility according to the identification codes of the articles to be processed by the backup operation and the backup operation;
   transmitting the backup request and the first manufacturing constraint to a second MES (manufacturing execution system) of a second fabrication facility according to the identification code of the support manufacturing facility;
   executing the backup operation and issuing a backup completion report, wherein the backup completion report comprises identification code for the articles processed by the backup operation and an updated manufacturing constraint;
   receiving the backup completion report and the updated manufacturing constraint from a second fabrication facility;
   transmitting the backup completion report and the updated manufacturing constraint to the first fabrication facility;
   updating the first manufacturing constraint according to the updated manufacturing constraint; and
   continuing processing of the articles processed by the backup operation to completion.

8. A method for controlling backup operation of articles between separately located fabrication facilities, comprising:
   receiving a backup request from a first fabrication facility, wherein the backup request comprises identification codes of articles to be processed by a backup operation, the backup operation, and support manufacturing facility;
   retrieving a first manufacturing constraint from the first fabrication facility according to the identification codes of the articles to be processed by the backup operation and the backup operation;
   transmitting the backup request and the first manufacturing constraint to a second fabrication facility according to the identification code of the support manufacturing facility;
   receiving a backup completion report from the second fabrication facility, wherein the backup completion report comprises identification codes for the articles processed by the backup operation and an updated manufacturing constraint; and
   transmitting the backup completion report to the first fabrication facility.

9. The method of claim 8, wherein the first and updated manufacturing constraints comprise a dynamic manufacturing constraint which varies with progress of the articles.

10. The method of claim 9, wherein the first and updated manufacturing constraints comprise a queue time constraint.

11. The method of claim 9, wherein the first and updated manufacturing constraints comprise an equipment constraint.

12. The method of claim 9, wherein the first and updated manufacturing constraints comprise a feedback constraint.

13. The method of claim 9, wherein the first and updated manufacturing constraints comprise a contamination constraint.

14. A computer readable storage medium for storing a computer program providing a method for controlling backup operation at a separately located fabrication facility, the method comprising:
   receiving a backup request from a first fabrication facility, wherein the backup request comprises identification codes of articles to be processed by a backup operation, the backup operation, and support manufacturing facility;
   retrieving a first manufacturing constraint from the first fabrication facility according to the identification codes of the articles to be processed by the backup operation and the backup operation;
   transmitting the backup request and the first manufacturing constraint to a second fabrication facility according to the identification code of the support manufacturing facility;
   receiving a backup completion report from the second fabrication facility, wherein the backup completion report comprises identification codes for the articles processed by the backup operation and an updated manufacturing constraint;
   receiving the backup completion report and updated manufacturing constraint from the second fabrication facility;
   transmitting the backup completion report and updated manufacturing constraints to the first fabrication facility.

15. The storage medium of claim 14, wherein the first and updated manufacturing constraints comprise a dynamic manufacturing constraint which varies with progress of the articles.

16. The storage medium of claim 15, wherein the first and updated manufacturing constraints comprise a queue time constraint.

17. The storage medium of claim 15, wherein the first and updated manufacturing constraints comprise an equipment constraint.

18. The storage medium of claim 15, wherein the first and updated manufacturing constraints comprise a feedback constraint.

19. The storage medium of claim 15, wherein the first and updated manufacturing constraints comprise a contamination constraint.

* * * * *